Nov. 20, 1934. H. I. MASTERS ET AL 1,981,656
BACK-UP TOOL
Filed Dec. 29, 1931

Inventors
Hulbert I. Masters
Thomas Cunningham
By
W. E. Currie Attorney.

Patented Nov. 20, 1934

1,981,656

UNITED STATES PATENT OFFICE 1,981,656

BACK-UP TOOL

Hulbert I. Masters and Thomas Cunningham, Mannington, W. Va.

Application December 29, 1931, Serial No. 583,656

1 Claim. (Cl. 81—72)

This invention relates to improvements in gripping devices of the type known as back-up tools adapted for operation on tubular members. The invention will be fully understood from the following description taken in connection with the accompanying drawing in which latter—

Figure 1:
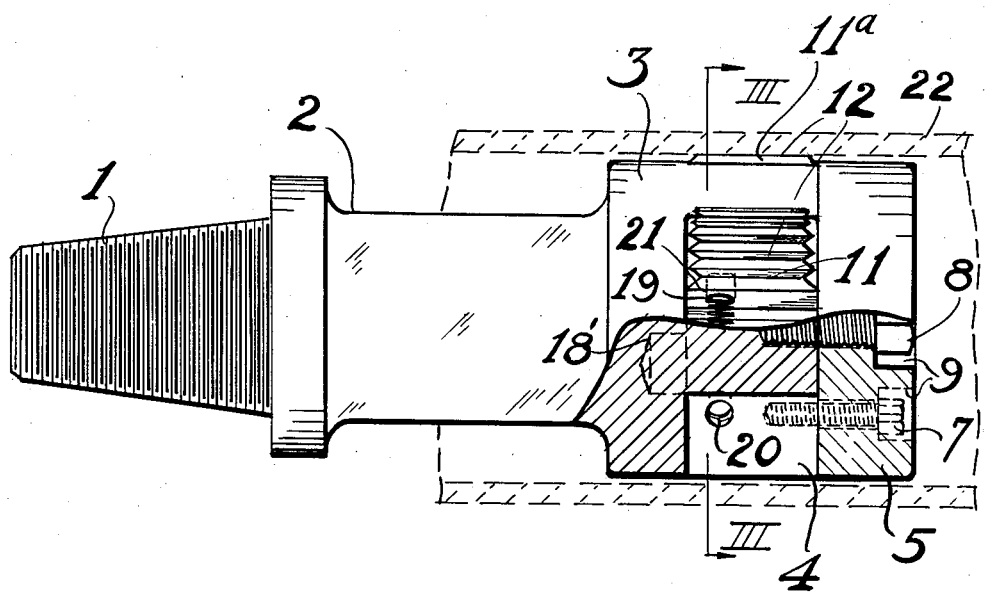
Fig. 1 is a side elevational view of the device with parts broken away and positioned in a casing shown in longitudinal section.

Referring particularly to the drawing, a mandrel is shown having a threaded end 1 for attachment to a cable, and a squared portion 2 for engagement by a wrench or the like when coupling or uncoupling the mandrel to the cable.

Figures 2, 3:
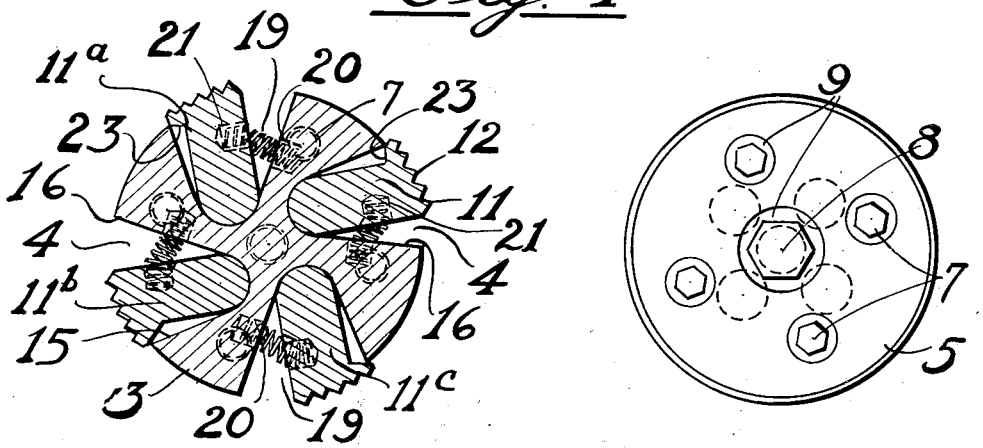
Fig. 2 is a bottom plan view of the device.
Fig. 3 is a transverse sectional view taken along the line III—III of Fig. 1.
Figure 4:
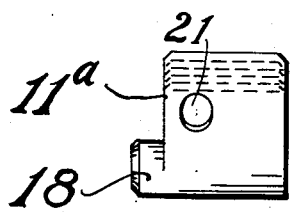
Fig. 4 is a side elevational view of a cam member or dog.

The mandrel is provided with a head 3 having a plurality of slots 4 opening through its end and sides tangentially in the same direction circumferentially of the head as can be clearly seen in Fig. 3. The slots are closed at the end of the head by means of a plate or cap 5. The cap is secured in position by means of the cap screws 7 and 8, the heads of which are inset in recesses 9 in the cap.

Cam members or dogs 11 each substantially the same shape as the slots 4 although narrower at the outer ends and having an inset portion 23 forming a lip on the outer edge of the cam, are provided with gripping surfaces 12 and are rotatably supported within the head about an axis substantially parallel with the longitudinal axis of the head, whereby the gripping surface of the cam can be protruded radially from or withdrawn within the head. The cam members are disposed within the tangentially opening slots 4.

Means are provided for stopping rotary movement of each cam member 11 in the same direction circumferentially of the head with the gripping surface protruding from the head. This means comprises a wall 15 in each slot serving as an abutment for its cam member and projecting circumferentially in the direction of the working rotation of the head, there being a lip formed on the outer edge of the cam member which is adapted to engage and partially override the edge of said wall. The opposite wall 16 of the slot is suitably spaced from the abutment wall to permit rotation of the cam member into a position with its high spot 12 withdrawn within the periphery of the head. Each cam member is rotatably supported in its slot by means of an arm 18 which protrudes laterally from the base of the cam member and is rotatably received by a recess 19 opening into the base of the slot adjoining the abutment wall 15 and in a direction substantially parallel with the longitudinal axis of the head.

Means for yieldably exerting pressure to rotate the cam member toward the abutment wall 15 include a helical spring 19 one end of which is disposed within a recess 20 in the wall 16 and the other end of which is disposed within an oppositely facing recess 21 in each cam member. The cam members are thus forced in rotation upwardly and will engage the inner walls of a casing such as casing 22 with sufficient pressure to cause the cam members to grip the walls of the casing.

The device can be utilized as a back-up tool when it is desired to unscrew an upper casing from a string of lower casings in an oil or gas well. When utilizing the device for such a purpose, the mandrel is lowered within an upper section of casing until the head is disposed in position to engage the next lower section of casing. The mandrel can be lowered into the casing without obstruction by the cam members by slightly rotating the mandrel in a counter-clockwise direction as viewed in Fig. 3 while the mandrel is being lowered. In the operation of unscrewing an upper section of casing any tendency of the lower section of casing to turn is obstructed by the locking of the cam members against the lower section of casing. The cam members automatically take hold of the casing and are easily released from the casing by a slight turn in a counter-clockwise direction as viewed in Fig. 3. The device is simple in construction and is easily handled.

While the device has been described as used more particularly as a back-up tool for well casings, it will be understood that it can be used as a wrench for unscrewing casings or other similar applications.

Various changes may be made within the scope of the appended claim in which it is desired to claim all novelty inherent in the invention as broadly as the prior art permits.

We claim:

A back-up tool for casings, comprising a mandrel having a solid head provided with circumferentially spaced openings through its end and sides forming slots having one wall thereof projecting circumferentially in the direction of the working rotation of the head and forming an abutment wall, a cam in each slot swingably mounted therein by means of a single arm protruding from the base of the cam and cooperating with a recess in the bottom of the slot, said cam having a portion of the side facing the abutment wall inset to form a lip on the outer edge of the cam adapted to engage and partially override the projection of said wall, serrations on the outer surface of the cam forming a gripping surface therefor, means for yieldably exerting pressure against the cam to swing it toward the abutment wall whereby the gripping surface of the cam is caused to protrude from the slot and engage the casing wall, and a cover plate for the mandrel preventing longitudinal movement of the cam members within the slot.

HULBERT I. MASTERS.
THOMAS CUNNINGHAM.